United States Patent
Sanchez Cano et al.

(10) Patent No.: US 11,136,250 B2
(45) Date of Patent: Oct. 5, 2021

(54) REACTOR FOR INTEGRAL WATER TREATMENT

(71) Applicant: I.D. ELECTROQUIMICA, S.L., Alicante (ES)

(72) Inventors: Gaspar Sanchez Cano, Alicante (ES); Guillermo Codina Ripoll, Alicante (ES); Jose Ramon Perez Mallol, Alicante (ES)

(73) Assignee: I.D. ELECTROQUIMICA, S.L., Alicante (ES)

( * ) Notice: Subject to any disclaimer, the term of this patent is extended or adjusted under 35 U.S.C. 154(b) by 15 days.

(21) Appl. No.: 16/755,145

(22) PCT Filed: Oct. 16, 2018

(86) PCT No.: PCT/ES2018/070670
§ 371 (c)(1),
(2) Date: Apr. 9, 2020

(87) PCT Pub. No.: WO2019/077183
PCT Pub. Date: Apr. 25, 2019

(65) Prior Publication Data
US 2020/0299159 A1  Sep. 24, 2020

(30) Foreign Application Priority Data
Oct. 16, 2017  (ES) .................... ES201731220U

(51) Int. Cl.
*C02F 1/66* (2006.01)
*C02F 1/28* (2006.01)
(Continued)

(52) U.S. Cl.
CPC ............... *C02F 1/66* (2013.01); *C02F 1/28* (2013.01); *C02F 1/325* (2013.01); *C02F 1/4674* (2013.01); *C02F 2103/42* (2013.01); *C02F 2209/06* (2013.01); *C02F 2209/29* (2013.01); *C02F 2303/04* (2013.01)

(58) Field of Classification Search
CPC ...... C02F 1/66; C02F 1/28; C02F 1/32; C02F 1/46; Y10T 29/49
See application file for complete search history.

(56) References Cited

U.S. PATENT DOCUMENTS 9,090,490 B2 * 7/2015 Lydic ..................... C02F 1/325

FOREIGN PATENT DOCUMENTS

CH 708088 11/2014
EP 2767513 8/2014
(Continued)

OTHER PUBLICATIONS

International Patent Application No. PCT/ES2018/070670, International Search Report, dated Mar. 26, 2019, 2 pages.

*Primary Examiner* — Walter D. Griffin
*Assistant Examiner* — Cameron J Allen
(74) *Attorney, Agent, or Firm* — Kilpatrick Townsend & Stockton LLP; Dean W. Russell

(57) ABSTRACT

The invention relates to a simplified modular reactor, where the method of purifying swimming pool waters can be carried out in an integral manner, where said method may comprise simultaneously applying the techniques of: oxidation-disinfection, ultraviolet radiation, and pH adjustment on the water to be treated.

13 Claims, 4 Drawing Sheets

(51) Int. Cl.
*C02F 1/32* (2006.01)
*C02F 1/467* (2006.01)
*C02F 103/42* (2006.01)

(56) References Cited

FOREIGN PATENT DOCUMENTS

| WO | 0142143 | 6/2001 |
| WO | 2013053971 | 4/2013 |
| WO | 2013082294 | 6/2013 |
| WO | 2015018761 | 2/2015 |

* cited by examiner

REACTOR FOR INTEGRAL WATER TREATMENT

CROSS-REFERENCE TO RELATED APPLICATIONS

This application is a U.S. National Phase under 35 U.S.C. § 371 of International Patent Application No. PCT/ES2018/070670, filed Oct. 16, 2018, which claims priority to Spanish Patent Application No. U201731220, filed Oct. 16, 2017, the contents of all of which are incorporated herein by this reference.

TECHNICAL FIELD OF THE INVENTION

The present invention corresponds to the technical field of integral swimming pool water treatments (oxidation of organic matter, disinfection, and pH adjustment) both for residential and public swimming pools.

BACKGROUND OF THE INVENTION

The concept of integral water treatment contemplates three factors that must be linked together and therefore considered as a whole: oxidation of organic matter, disinfection, and pH adjustment.

For this purpose, there are a series of swimming pool water treatments today based on different techniques, which are being widely used. Out of these treatments, the most widespread and innovative in recent years have been those which use the electrolysis technique and the ultraviolet radiation technique for disinfection. In both, in a parallel and simultaneous manner, the techniques must be accompanied by thorough control of water pH.

With the electrolysis technique, the water to be treated is subjected to continuous electric current by means of introducing electrodes (cathode, anode) therein. In the phenomenon of electrolysis, cathodic reduction and anodic oxidation processes which are utilized for swimming pool water purification (organic matter oxidation) and disinfection (elimination of microorganisms) take place simultaneously. Electrolysis processes require certain conductivity in water. The entire desired range of conductivity can be covered, as needed, ranging from natural conductivity created by a ClNa concentration comprised between about 0.5 g/L and 2 g/L, to a conductivity characteristic of sea water with an approximate salt concentration of 36 g/L, salt concentrations between 3 g/L-6 g/L (standard concentration) being the most standard conductivity.

On the other hand, the electrolysis process increases the pH of the water, so it requires the controlled and continuous addition pH reducer (pH minus). Durante the electrolysis process, small concentrations of chlorine and sodium hydroxide, which recombine to form hypochlorous acid, HClO, which subsequently reduce the organic matter and pathogens, converting back into salt, are generated in situ.

This method has a series of advantages, such as water and energy savings, as residual cyanuric acid does not increase, a reduction in chloramines (cathodic reduction), an oxidation of organic matter, and furthermore, chlorine does not have to be added in solid or liquid form because the actual electrolysis reaction produces, in situ, sufficient amounts of chlorine (1-2 ppm). Furthermore, the obtained water quality is excellent, requires simple maintenance, and assures a residual disinfection effect (chlorine 1-2 ppm).

On the other hand, the ultraviolet (UV) radiation technique, which is based on using the effect of said radiation by means of using ultraviolet light emitters, such as low- or medium-pressure lamps isolated from the medium by means of quartz tubes, causing disinfection at given doses of $mJ/cm^2$, elimination of microorganisms (viruses, bacteria).

This is achieved by means of a physical process of altering the DNA of said microorganisms, preventing their reproduction, and all this without chemical product additives or variations in the odor, taste, or pH of the water.

On the other hand, UV radiation has the ability to eliminate chloramines present in swimming pool water, which are limited by law (generally to <0.6 mg/L) and are the eliciting factors of the oppressive smell of "chlorine" and irritations caused to the skin, mucous membranes, as well as the respiratory tracts for bathers, companions, and maintenance personnel.

UV treatment does not have the ability to oxidize organic matter, so the addition of some type of oxidizer (in situ electrolysis or ex situ chemicals such as chlorine, bromine, or peroxide), and therefore continuous pH control, are necessary.

The combination of UV and electrolysis techniques is a synergistic association which involves a double disinfection treatment (electrolysis+radiation) with twice the ability to eliminate byproducts (elimination of chloramines in water/air, cathodic reduction, and radiation), with the ability to eliminate organic matter (anodic oxidation plus electrolytically generated free chlorine), and with a residual effect (electrolytically generated chlorine).

In any case, and with any type of technique or combination thereof, the treatment must be accompanied by thorough control of the pH of the water, both to maximize treatment efficacy, and to minimize unwanted byproducts in the water and air, as well as to protect bathers against irritations and installations against corrosion or calcareous depositions. According to the techniques used in treatment, pH-plus (carbonates, NaOH) or pH-minus (inorganic acids in the gas, solid, liquid forms, such as $CO_2$-gas, $NaHSO_4$-sol, HCl-liq, or sulfuric-liq, for example) may be required.

The combination of the electrolysis technique with UV radiation and the addition of $CO_2$-gas is of particular interest. The minimization of byproducts (organochlorine compounds) obtained with this pH minus compared to its alternatives, and the fact that it minimizes handling risks at the same time because it is a "natural" reagent found in nature, must be taken into consideration along with the advantages pointed out in the preceding paragraphs.

International patent application number WO2013053971 describes the method of purifying water, without adding salts, for swimming pool water treatment, comprising the simultaneous application of electrolysis and ultraviolet radiation techniques on the water to be treated, as well as a reactor for carrying out the method, which has on the inside thereof electrodes and an ultraviolet lamp, as well as a pH-minus injector at the inlet of the reactor. This reactor does not have any element which improves pH-minus distribution.

On the other hand, the addition of $CO_2$ in swimming pool water for pH control is also known by international patent application WO2015018761, where a specific system for introducing said $CO_2$ is described.

Therefore, the development of a reactor where these methods and their different combinations can be carried out in an effective manner is of absolute importance.

DESCRIPTION OF THE INVENTION

The present invention has developed a simplified modular reactor, where the method of purifying swimming pool waters can be carried out in an integral manner, where said method may comprise simultaneously applying the techniques of: oxidation-disinfection, ultraviolet radiation, and pH adjustment on the water to be treated.

Therefore, the invention describes a reactor for integral water treatment comprising:
- an inlet nozzle;
- a perimetral chamber having two volumes separated by a perforated surface:
  - a first volume, for the distribution and injection of a pH-adjusting compound, comprising: an injector of the pH-adjusting compound;
  - a second volume comprising a filler to favor absorption of the pH-adjusting compound;
- a central chamber inside the perimetral chamber communicated in its lower portion with the perimetral chamber through holes preventing the passage of the parts forming the filler;
- an outlet nozzle where the water is collected once it has been treated.

A method of purifying water is carried out in the reactor of the invention, said method comprising a first phase in which the water enters the reactor through the inlet nozzle, reaching the first volume of the perimetral chamber where the pH-adjusting compound is injected and distributed.

Next, the water circulates through the perimetral chamber towards a second volume with the filler, where the pH-adjusting compound is suitably mixed.

After going through the perimetral chamber, the water enters the central chamber (oxidation-disinfection and/or ultraviolet treatments) in search of the outlet nozzle of the reactor.

BRIEF DESCRIPTION OF THE DRAWINGS

For the purpose of helping to better understand the features of the invention according to a preferred practical embodiment thereof, a set of drawings is attached as an integral part of said description in which the following is depicted in an illustrative and non-limiting manner.

DETAILED DESCRIPTION OF A PREFERRED EMBODIMENT OF THE INVENTION

Figure 1A:
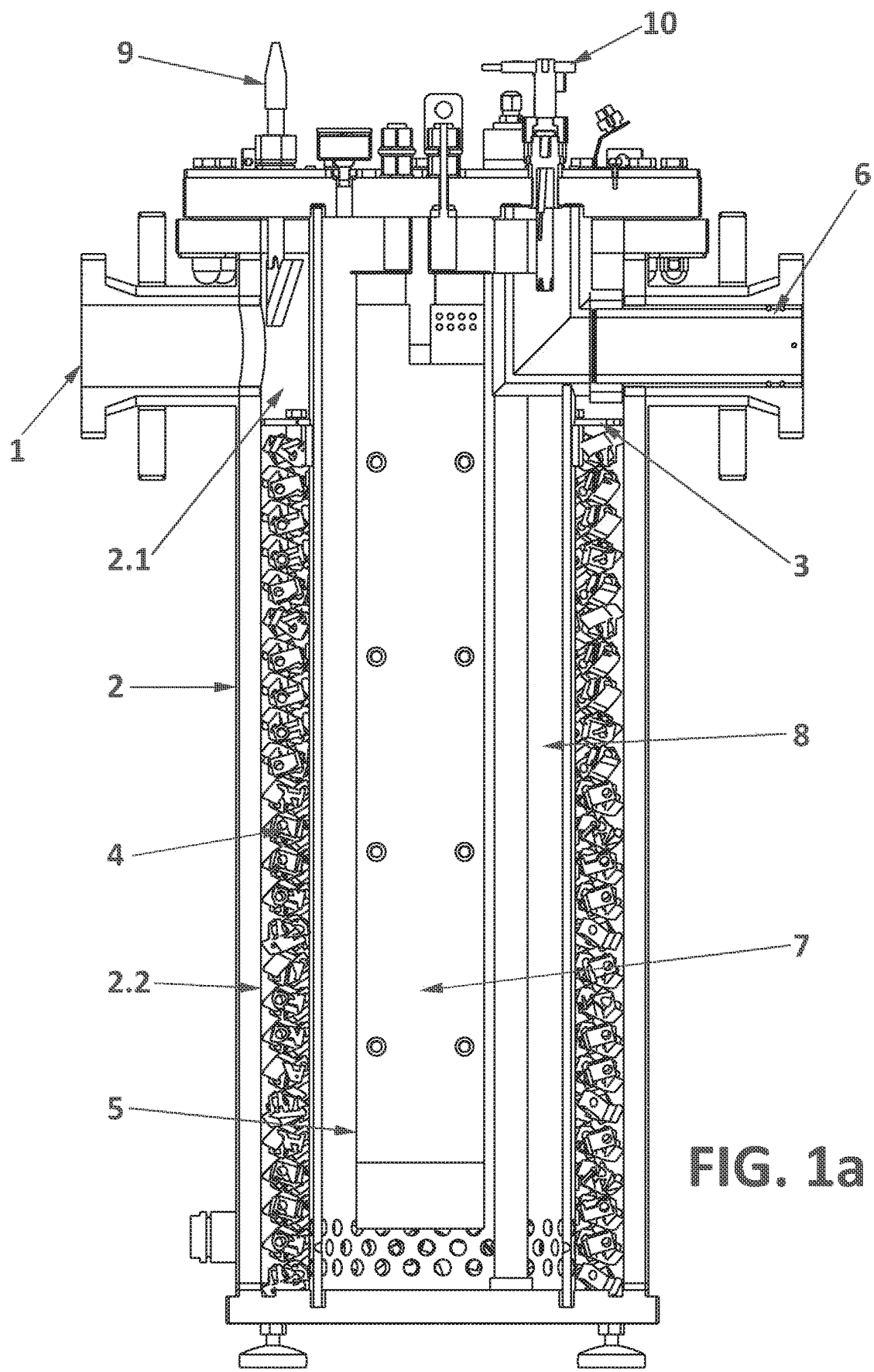
FIGS. 1A and 1B show respective section views of the modular integrated reactor, indicating the circulation of the water to be treated from the inlet to the outlet of the reactor, going through the different chambers/parts of the reactor.
Figure 1B:
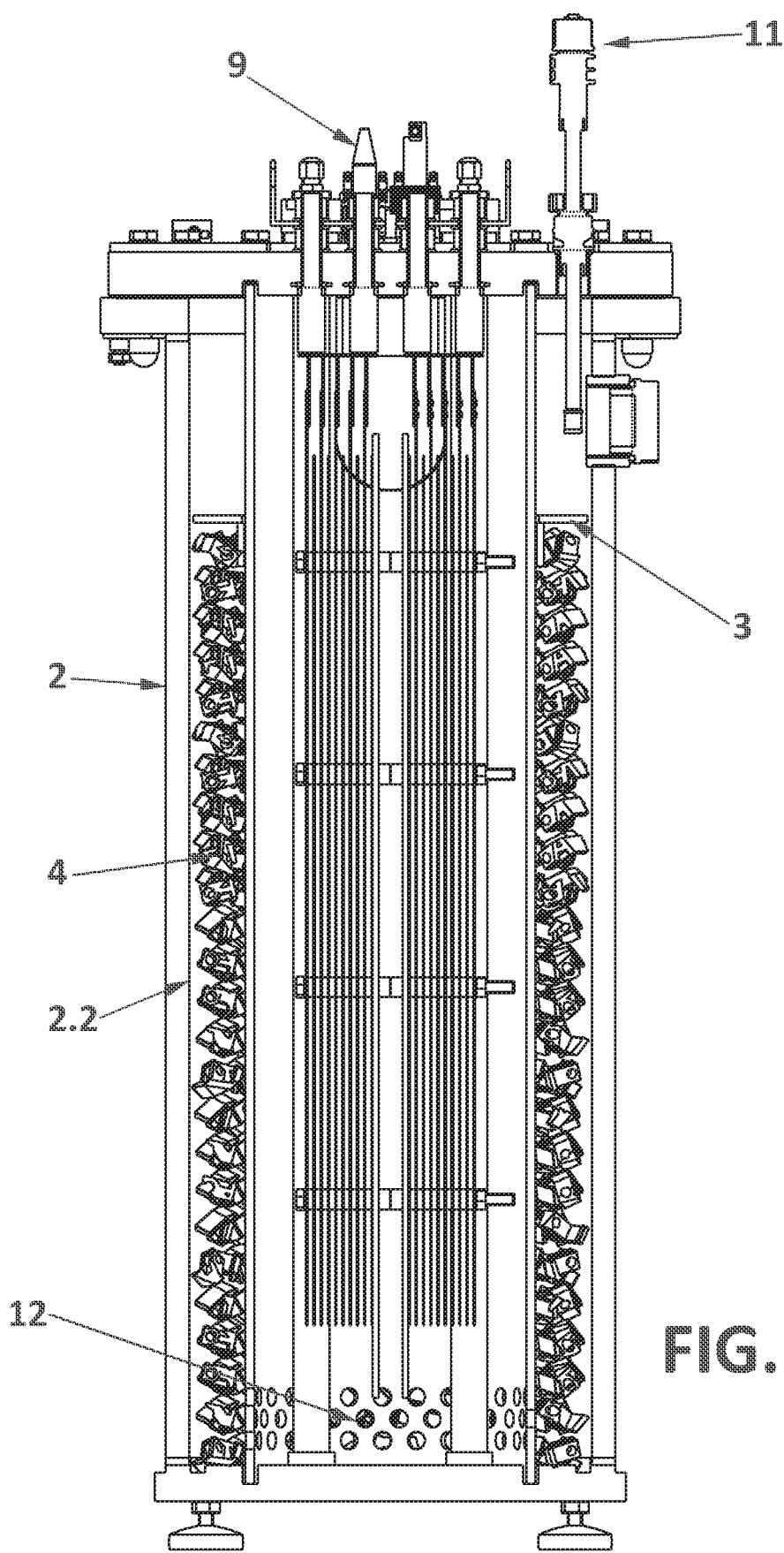
Figure 2:
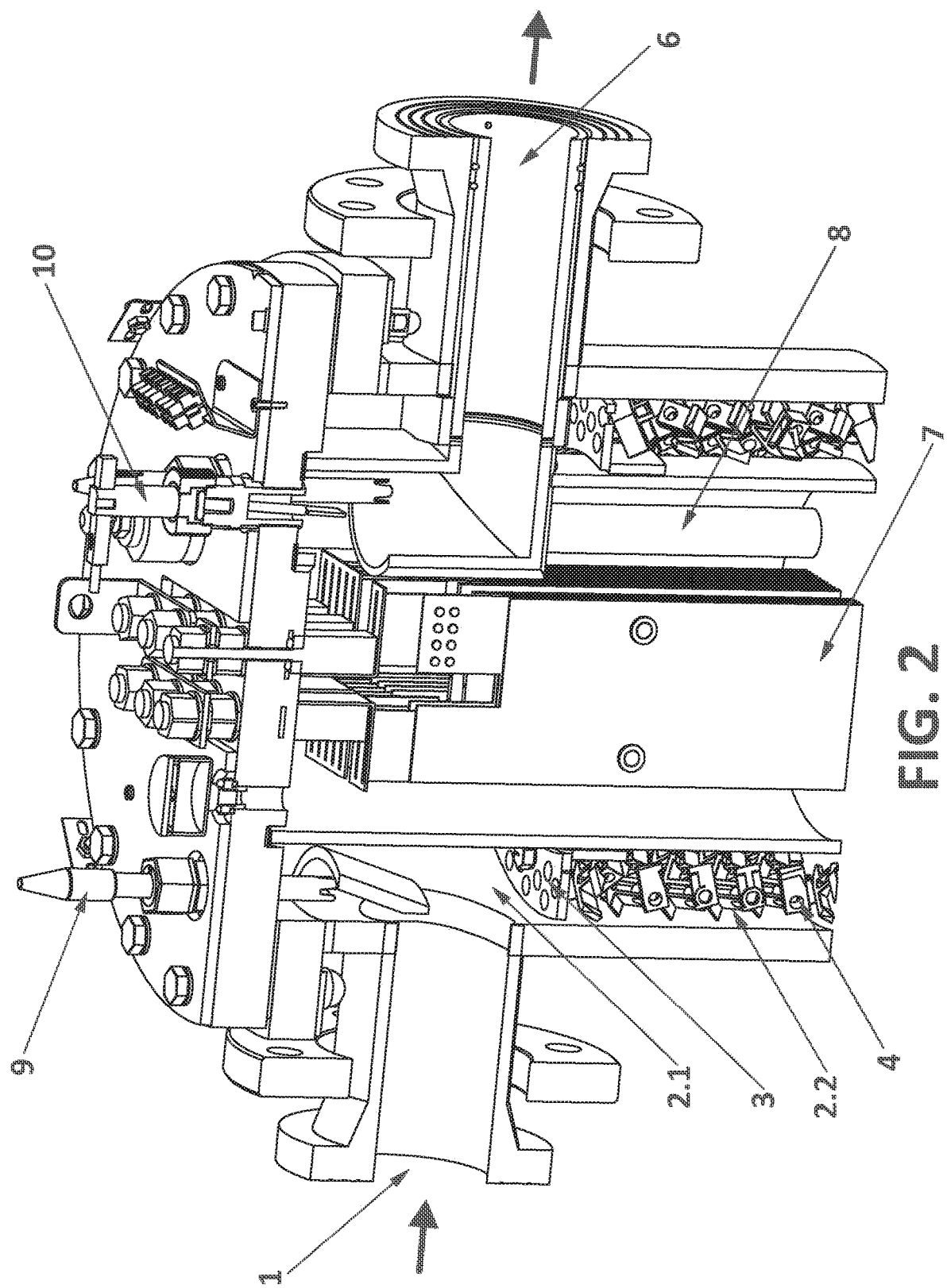
FIG. 2 shows a detailed section view of the head of the integrated reactor where the parts thereof can be seen in detail.

As mentioned, the invention relates to a reactor for integral water treatment comprising:
- an inlet nozzle (1);
- a perimetral chamber (2) having two volumes separated by a perforated surface (3):
  - a first volume (2.1), for the distribution and injection of a pH-adjusting compound, comprising: an injector (11) of the pH-adjusting compound;
  - a second volume (2.2) comprising a filler (4) to favor absorption of the pH-adjusting compound;
- a central chamber (5) inside the perimetral chamber (2) communicated in its lower portion with the perimetral chamber (2) through holes (12) preventing the passage of the parts forming the filler;
- an outlet nozzle (6) where the water is collected once it has been treated.

A pH and/or chlorine reading of the water to be treated can be taken at the inlet nozzle (1).

Therefore, the inlet nozzle (1) preferably comprises: a pH sensor. Likewise, the inlet nozzle (1) preferably comprises a chlorine sensor.

A pH and/or chlorine and/or flow reading of the water to be treated can be taken at the outlet nozzle (6).

Therefore, the outlet nozzle (6) preferably comprises: a pH sensor. Likewise, the outlet nozzle (6) preferably comprises a chlorine sensor. The outlet nozzle (6) preferably comprises a flow switch (10).

If the arrangement between the first volume (2.1) and the second volume (2.2) is such that the first volume (2.1) is located above the second volume (2.2), the mixture of the pH-adjusting compound with the water is improved, particularly if this compound is gas.

Therefore, the first volume (2.1) is preferably located above the second volume (2.2) separated by the perforated surface (3).

The filler (4) is preferably formed by a grouping of a plastic body that is repeated, generally having a spherical and/or cylindrical geometry with pores or gaps which may be of a higher density than water or lower density than water, assuring in any case the increase in contact surfaces and improving distribution in the reactor upon passage therethrough without preferential channels.

The inside of the central chamber (5) preferably comprises at least two electrodes (7) to perform electrolysis. More preferably, these electrodes (7) are in the form of a plate or mesh, having a monopolar, bipolar, or mixed electrical configuration. They apply a cathode-anode voltage between 3 and 24 VDC and a current density between 1 and 60 mA/cm$^2$, with salt concentrations between 0.3 and 6 g/l.

Preferably, at least one ultraviolet light emitter is present inside the central chamber (5). It is preferably an ultraviolet lamp (8). More preferably, the ultraviolet lamp (8) is a low- or medium-pressure lamp; the ultraviolet lamp is tubular-shaped and comprises an also tubular-shaped element for isolating it from the medium, preferably formed by a quartz sleeve. Said lamp provides a dose of UV-C between 1 and 60 mJ/cm$^2$.

Even more preferably, at least two electrodes (7) and one ultraviolet lamp (8) are present in the central chamber (5) so as to simultaneously cause the oxidation-disinfection and ultraviolet radiation treatment in situ.

Preferably, the injector (11) of the pH-reducing compound is a $CO_2$ injector. The organochlorine byproducts are minimized with $CO_2$ compared to its alternatives, while at the same time handling risks are minimized as it is a reagent found in nature.

Figure 3:
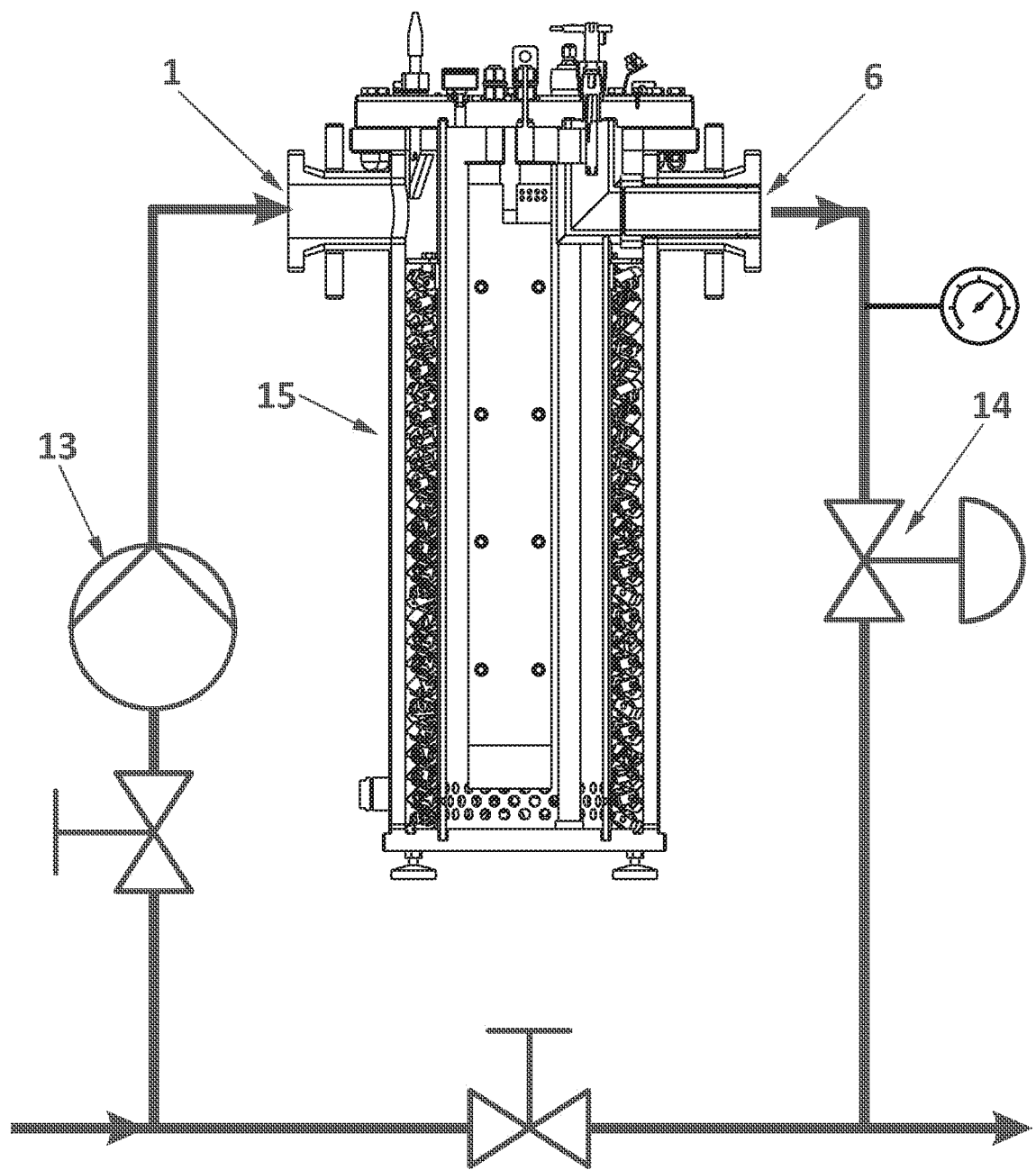
FIG. 3 shows the by-pass installation with pressure control in the reactor integrated by means of pump at the inlet and control valve at the outlet.

It is important to control the pressure inside the reactor for integral water treatment of the invention, where the absorption chamber (2.2) and filler (4) are located, as indicated in FIG. 3. The working pressure can either be the natural pressure obtained in the by-pass installation, or else it can be increased by means of an auxiliary pump at the inlet (13) and a pressure control valve at the outlet (14), in this case the $CO_2$ gas absorption process is maximized.

Therefore, the inlet nozzle (1) and the outlet nozzle (6) are preferably attached in by-pass arrangement with an auxiliary pump (13) at the inlet and a control valve (14) at the outlet.

Finally, as an alternative to electrolysis treatment for causing oxidation-disinfection, the reactor may have in the central chamber (5) a chemical oxidizer-disinfectant metering unit instead of the electrolysis electrodes.

The invention claimed is:

1. Reactor for integral water treatment, comprising:
   an inlet nozzle (1);
   a perimetral chamber (2) having two volumes separated by a perforated surface (3):
   a first volume (2.1), for the distribution and injection of a pH-adjusting compound, comprising: an injector (11) of the pH-adjusting compound;
   a second volume (2.2);
   an outlet nozzle (6) where the water is collected once it has been treated characterized in that the second volume (2.2) comprises a filler (4) to favor absorption of the pH-adjusting compound;
   and the reactor also comprises a central chamber (5) inside the perimetral chamber (2) communicated in its lower portion with the perimetral chamber (2) through holes (12) preventing the passage of the parts forming the filler.

2. Reactor according to claim 1, characterized in that the inlet nozzle (1) comprises: a pH sensor.

3. Reactor according to claim 1, characterized in that the inlet nozzle (1) comprises: a chlorine sensor.

4. Reactor according to claim 1, characterized in that the outlet nozzle (6) comprises: a pH sensor.

5. Reactor according to claim 1, characterized in that the outlet nozzle (6) comprises: a chlorine sensor.

6. Reactor according to claim 1, characterized in that the outlet nozzle (6) comprises: a flow switch (10).

7. Reactor according to claim 1, characterized in that the first volume (2.1) is located above the second volume (2.2) separated by the perforated surface (3).

8. Reactor according to claim 1, characterized in that the inside of the central chamber (5) comprises at least two electrodes (7) to perform electrolysis.

9. Reactor according to claim 1, characterized in that it comprises at least one ultraviolet light emitter inside the central chamber (5).

10. Reactor according to claim 9, characterized in that the ultraviolet light emitter is an ultraviolet lamp (8).

11. Reactor according to claim 1, wherein the injector of the pH-adjusting compound is a $CO_2$ injector (11).

12. Reactor according to claim 1, characterized in that the inlet nozzle (1) and the outlet nozzle (6) are attached in by-pass arrangement with an auxiliary pump (13) at the inlet and a control valve (14) at the outlet to regulate the pressure inside the reactor.

13. Reactor according to claim 1, characterized in that it has a chemical oxidizer metering unit in the central chamber (5).

* * * * *